Jan. 30, 1951 W. G. WEHR 2,539,602
SHEAR PRESS
Original Filed April 21, 1944 4 Sheets-Sheet 1

INVENTOR.
BY WILLIAM G. WEHR
Lewis, Hudson, Boughton & Williams
ATTORNEY

Jan. 30, 1951 W. G. WEHR 2,539,602
SHEAR PRESS

Original Filed April 21, 1944 4 Sheets-Sheet 3

INVENTOR.
WILLIAM G. WEHR
BY
Kwis Hudson, Boughton & Williams
ATTORNEYS

Jan. 30, 1951  W. G. WEHR  2,539,602
SHEAR PRESS

Original Filed April 21, 1944  4 Sheets-Sheet 4

INVENTOR.
WILLIAM G. WEHR
BY
Kwis Hudson Boughton & Williams
ATTORNEYS

Patented Jan. 30, 1951

2,539,602

UNITED STATES PATENT OFFICE 2,539,602

SHEAR PRESS

William G. Wehr, North Madison, Ohio, assignor to The Cleveland Crane & Engineering Company, Wickliffe, Ohio, a corporation of Ohio Original application April 21, 1944, Serial No. 532,078, now Patent No. 2,397,896, dated April 2, 1946. Divided and this application November 19, 1945, Serial No. 629,382

3 Claims. (Cl. 164—58)

The present invention relates to power-operated, heavy duty shears and, more particularly, to a novel and improved method of supporting the lower stationary shearing knives thereof.

When heavy duty shears of the general type employed in shops engaged in fabricating metal plates and the like are initially set up and after each grinding of the lower shearing knife, the knife is adjusted level or substantially level with the top of the bed or work table. Means heretofore employed for accomplishing the aforesaid adjustment have been unsatisfactory for one reason or tnother. With the foregoing in mind, the principal object of the present invention is the provision of a novel and improved, power-operated, heavy duty shears of the character referred to having improved means for conveniently adjusting the height of the lower shearing knife, which means is simple in construction, reliable in operation, and supports the knife throughout its entire length in such a manner that it will not flex under the heavy loads to which it is subject in operation.

The invention resides in certain constructions and combinations and arrangements of parts, and further objects and advantages will be apparent to those skilled in the art to which it relates from the following description of the preferred embodiment described with reference to the accompanying drawings forming a part of this specification in which similar reference characters designate corresponding parts throughout the several views, and in which Fig. 1 is a front elevational view of a power-operated, heavy duty shears embodying the present invention;

Figure 1:
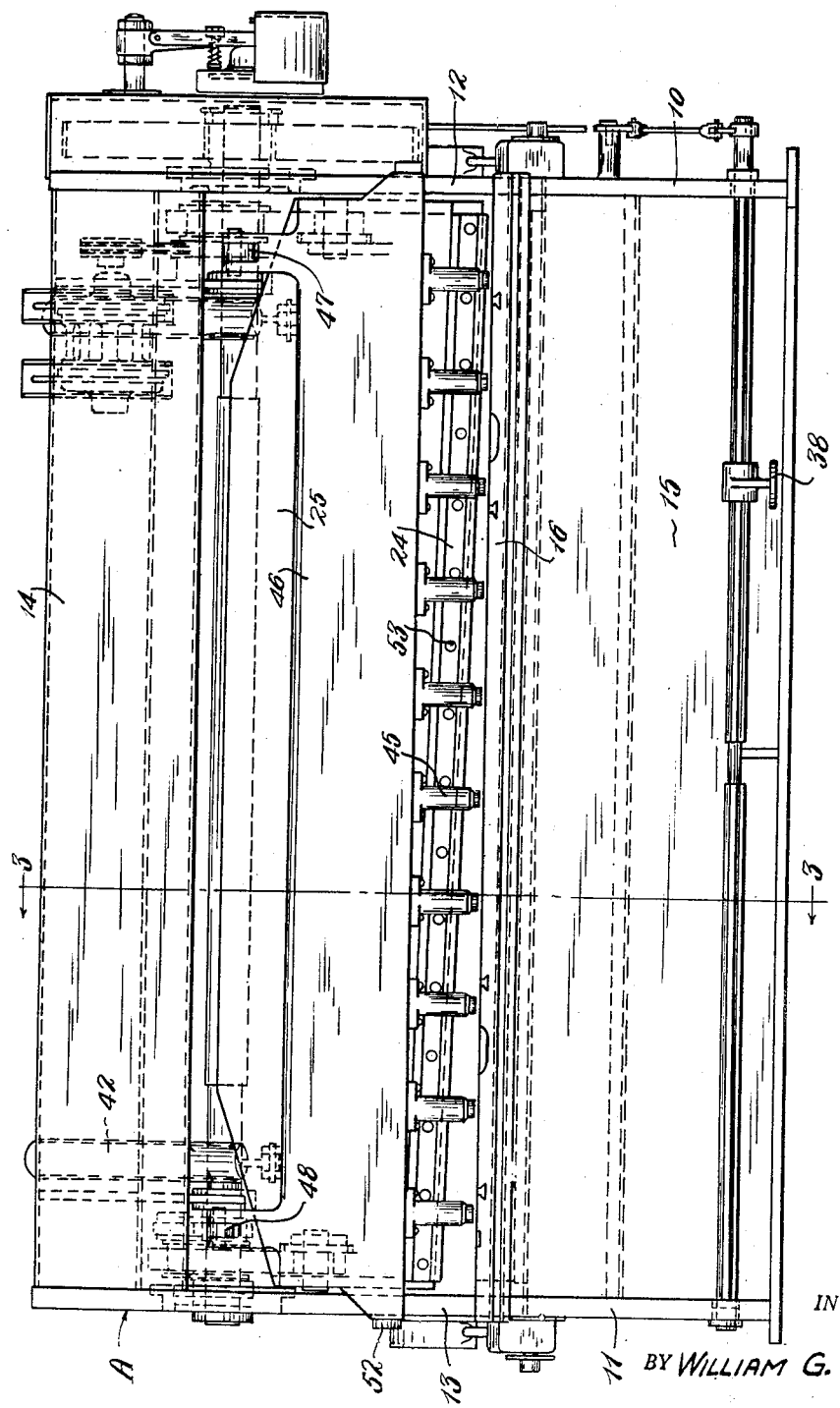
Figure 2:
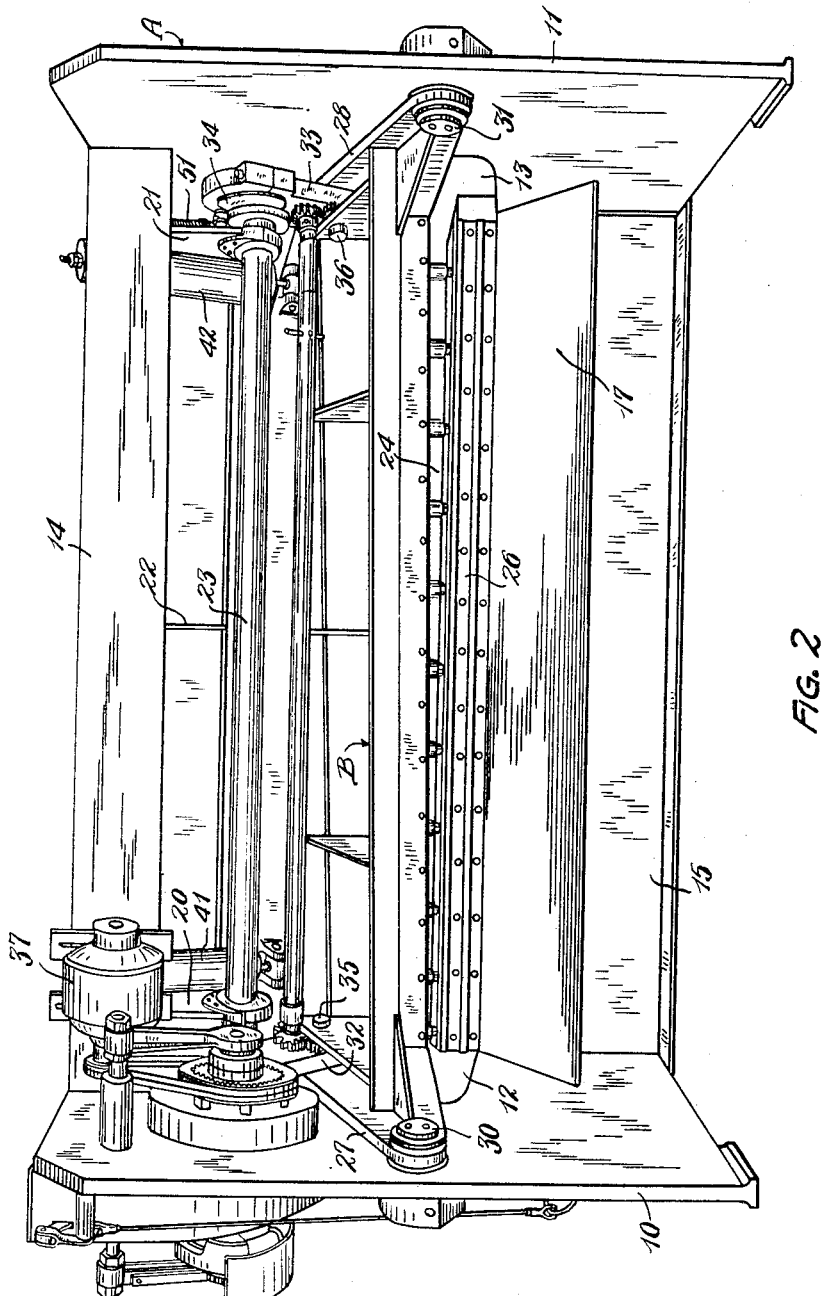
Fig. 2 is a rear view of the shears shown in Fig. 1.

This application is a division of my copending application Serial No. 532,078, now Patent No. 2,397,896, issued April 2, 1946, and only those parts of the shears shown and described in said application which are necessary to a complete understanding of the present invention are herein shown and described in detail. Reference to the aforesaid application is made for a complete showing and description of those parts of the shears not fully shown and described herein.

Referring to the drawings, the reference character A designates a frame comprising stress-resisting, plate-like end members or side housings 10, 11 having aligned openings 12, 13, respectively, in their front edges; a crown 14; and a bed comprising plate-like members 15, 16 and 17, the latter of which forms a scrap chute. The vertical plate-like member 15 is located immediately to the rear of and welded to the horizontal plate-like member 16, which member in addition to reinforcing the upper edge of the member 15, forms a support or work table for the work. The upper member or crown 14 is generally box-shaped in cross-section and has its opposite ends welded to the side housings 10, 11 adjacent to their front upper edges. Web members 20, 21 and 22 welded to the interior of the member 14 reinforce the same and the lower ends of the members 20, 21 which extend below the rear side of the member 14 form supports for suitable bearings within which a crankshaft 23 is rotatably supported.

Figure 3:
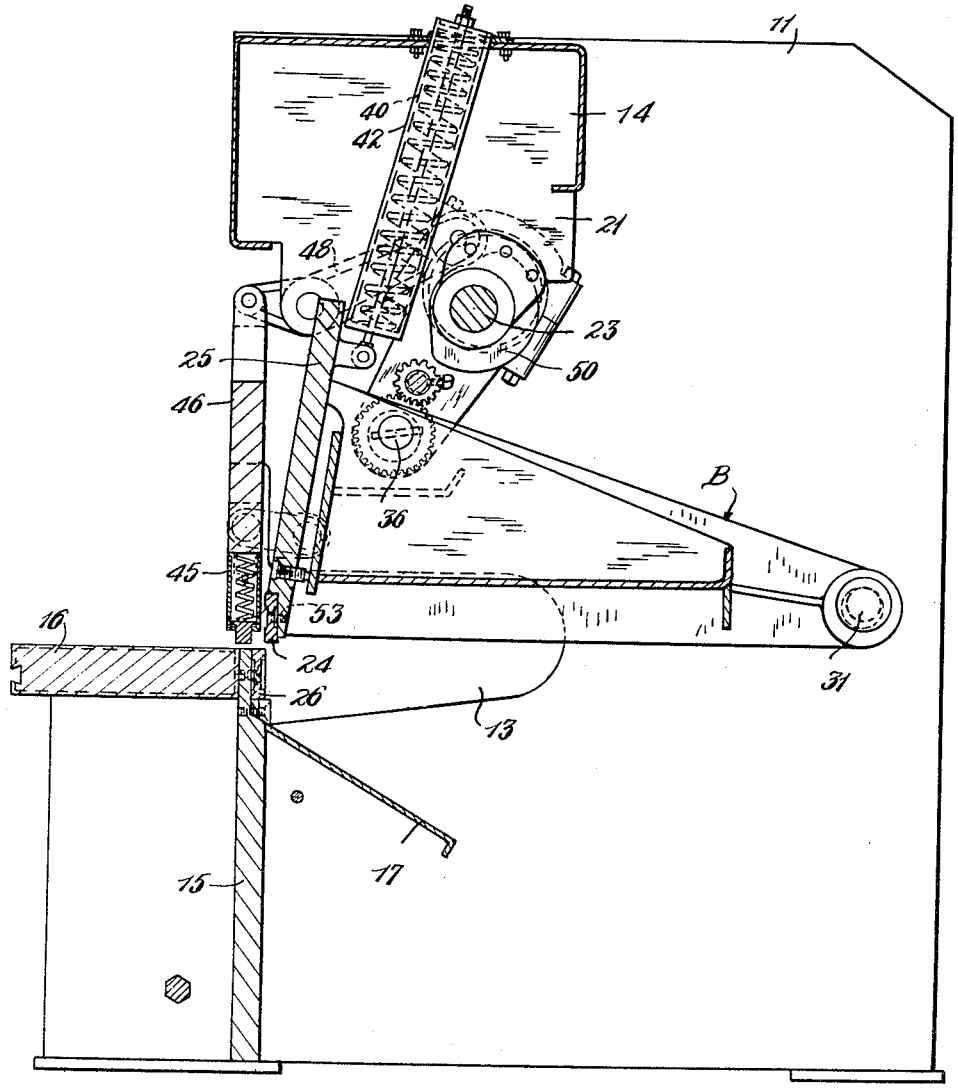
Fig. 3 is a sectional view approximately on the line 3—3 of Fig. 1.
Figure 4:
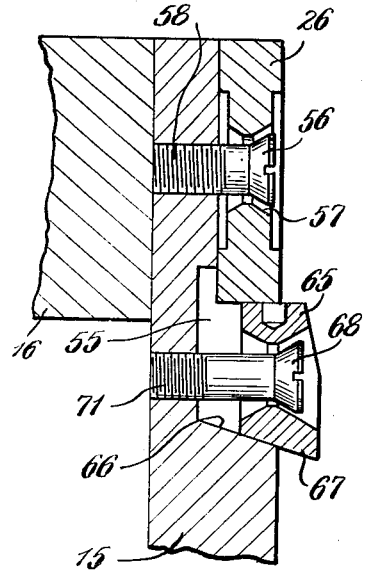
Fig. 4 is an enlarged view of a portion of Fig. 3.
Figure 5:
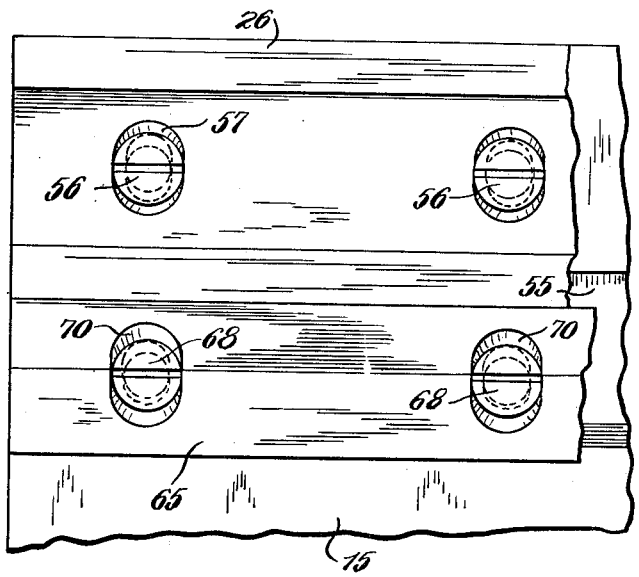
Fig. 5 is a fragmentary view of Fig. 4, looking from the right.

The shearing operation is performed by a movable shearing knife 24 connected to the lower front edge of an inclined plate 25 forming a part of a movable ram or blade, designated generally by the reference character B and a lower stationary shearing knife 26 located adjacent to the upper rear corner of the bed. The movable ram or upper blade B is of built-up construction and comprises end members 27, 28 welded to the ends of the plate 25 and extending toward the rear where they are rotatably connected to short shaft-like members 30, 31 rotatably supported in suitable apertures in the side housings 10, 11, respectively, for rotation about axes eccentric to the axes about which the end members 27, 28 are connected thereto. The front plate 25 of the blade B is inclined at a slight angle to the vertical, as clearly shown in Fig. 3, to provide clearance between the ram or movable blade B and the stationary shearing knife 24 when the blade is moved in a downward direction.

The front end of the ram or movable blade B is supported and the entire blade assembly is adapted to be oscillated about the shafts 30, 31 by pitmans 32, 33, the upper ends of which are operatively connected to eccentrics 34 on the crankshaft 23 and the lower ends to short shafts 35, 36 fixed in opposite ends of the blade B. The crankshaft 23 is rotated to reciprocate the movable ram or blade B by an electric motor 37 adjustably secured to the back of the crown 14 and operatively connected to the crankshaft by means including a friction clutch and brake operated in such a manner that when the foot treadle 38 is depressed and immediately released, the crankshaft makes one complete revolution but will continue to rotate as long as the foot pedal is depressed. As shown, the weight of the movable blade B is counterbalanced by adjustable compression springs 40, one at either end of the ram, located within tubular housings 41, 42 fixed to the crown member 14.

The shears shown also includes a plurality of spring-loaded, hold-down devices 45 detachably bolted to the lower edge of a hold-down plate 46 suspended from the forward arms of bell crank levers 47, 48 pivotally connected to the plates 20, 21, the rear arms of which levers are provided with rollers adapted to engage cams 50 on the crankshaft 23. The levers 47, 48 are continuously urged in a clockwise direction, as viewed in Fig. 3, to engage the rollers thereon with the cams 50 by suitable compression springs 51 interposed therebetween and the top of the crown member 14. The lower part of the hold-down plate 46 is connected to the side housings 10, 11 by links 52, one at either side of the hold-down plate, which links are pivotally connected to the hold-down plate and to the side housings 10, 11.

The lower front edge of the plate 25 is cut out so as to receive the upper shearing knife 24, which knife is held in position therein by a plurality of screws 53 projecting therethrough and threaded into suitably tapped apertures adjacent to the lower edge of the plate 25. The heads of the screws 53 are located in a groove in the front face of the shearing knife and are countersunk so as not to interfere with the oscillation of the movable blade B.

Figure 6:
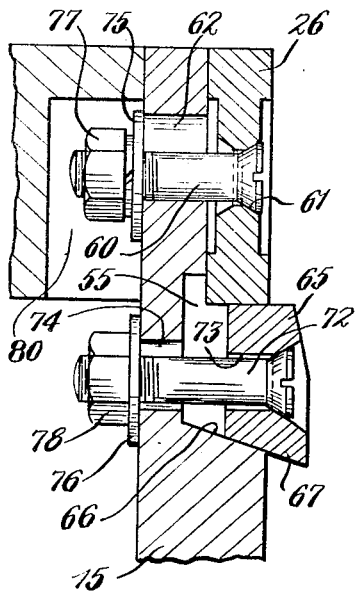
Figs. 6 and 7 are views similar to Figs. 4 and 5 but showing a modified construction.
Figure 7:
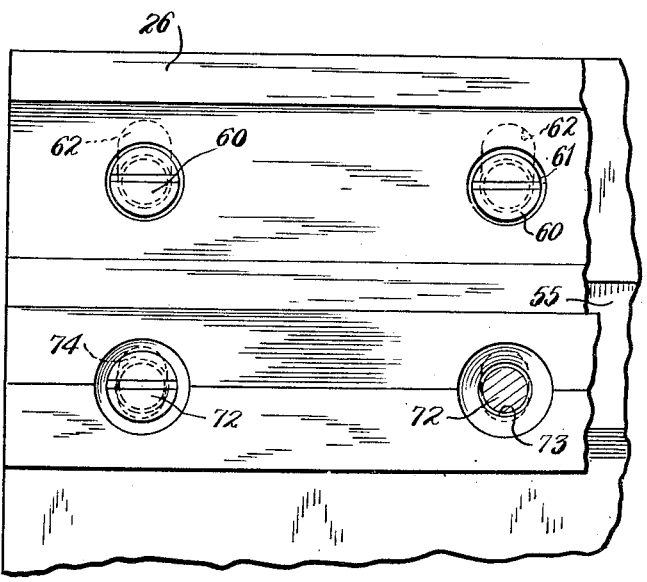

The lower shearing knife 26 is adjustably secured in a cut-out portion 55 extending along the upper rear edge of the bed member 15 by a plurality of headed screws 56 projecting through vertically elongated holes 57 therein and threaded into suitably tapped apertures 58 in the member 15. The heads of the screws 56 are countersunk in the rear side of the shearing knife 26 so as not to interfere with the movement of the upper shearing knife 24 or material sheared thereby. Alternatively, the blade 26 may be secured to the bed by bolts 60, see Figs. 6 and 7, projecting through round holes 61 in the blade and vertically elongated holes 62 in the member 15 or by some suitable equivalent arrangement.

The bottom of the shearing knife 26 is supported and the knife is adapted to be adjusted vertically so as to align the top thereof with the top of the member 16 which forms the work table by an elongated gib bar 65 extending the entire length of the shearing knife and interposed between the bottom thereof and a rearwardly inclined surface 66 at the bottom of the cut-out portion 55 of the bed member 15. The lower surface 67 of the gib 65 is inclined in a manner to cooperate with the inclined surface 66 of the bed member. The gib is held in position and adapted to be adjusted toward and from the bed member 15 to raise or lower the knife 26 by a plurality of screws 68 projecting through vertically elongated slots 70 therein and threaded into suitably tapped roles 71 in the bed member 15. Alternatively the gib bar 65 may be secured by bolts 72, see Figs. 6 and 7, projecting through round holes 73 in the gib bar and vertically elongated holes 74 in the member 15 or by some suitable equivalent arrangement. The bolts 60, 72 are provided with washers 75, 76, respectively, and nuts 77, 78, respectively, located at the front face of the member 15. With the construction shown in Figs. 6 and 7, slots 80 are cut in the member 16 to accommodate the washers 75 and the nuts 77.

The shearing knife 26 may be adjusted horizontally with respect to the member 16, if desired, by shims or the like interposed behind the knife. The fact that the gib 65 is relatively long and flexible enables various parts of it to be drawn into the aperture 55 different amounts, thus obtaining any desired vertical adjustment of the shearing knife 26 while providing a continuous support for the knife throughout its length. With this construction, the shearing knife is rigidly supported at all times. With the particular form of shears shown, the fact that the gib bar 65 projects slightly to the rear of the cutting edge of the lower shearing knife 26 is immaterial because the upper shearing knife 24 moves along an arc and will clear the gib even though the movement of the movable blade B is sufficient to carry the upper knife 24 to a position below the lower knife 26. I desired, the gib 65 can be so constructed that it will fit wholly within the cut-out portion 55.

From the foregoing it will be apparent that the objects of the invention heretofore enumerated and others have been accomplished and that there has been provided a novel and improved shears of the character referred to comprising means for adjusting the lower knife vertically, which means supports the knife throughout its length. While the preferred embodiment of the invention has been described in considerable detail, I do not wish to be limited to the particular construction shown which may be varied within the scope of this invention and it is my intention to hereby cover all adaptations, modifications and uses thereof which come within the practice of those skilled in the art to which the invention relates and within the scope of the appended claims.

Having thus described my invention, what I claim is:

1. In a power-operated shears, the combination of a bed adapted to have an elongated shearing knife connected thereto with its upper edge substantially aligned with the upper surface of said bed, an elongated flexible gib extending longitudinally of and underneath said knife and adapted to support the latter throughout its length and upon movement thereof in a direction transverse to the length of said knife to adjust said knife vertically relative to said bed, said bed and said gib having engaging surfaces inclined transversely of the length of said knife, a plurality of means spaced along said gib for adjusting intermediate portions of said gib relative to said bed in a direction transversely of the length of said knife, and means adapted to permit vertical movement of said knife upon adjusting movement of said gib and to clamp said knife to said bed after completion of an adjustment of said gib.

2. In a power operated shear, a bed, an elongated shearing knife having one side in frictional engagement with a surface of said bed, a plurality of clamping means disposed along said knife and adapted to clamp said knife to said surface, an elongated flexible gib disposed beneath and substantially coextensive with said knife, said bed having a surface on which said gib rests, cam means formed along one edge of said gib and operative when said gib is moved laterally with respect to said knife for effecting vertical movement of said knife, and a plurality of means along said gib for adjusting intermediate portions of said gib laterally relative to said knife.

3. In a power operated shear, a bed, an elongated shearing knife having one side in frictional engagement with a surface of said bed, a plurality of clamping means disposed along said knife and adapted to clamp said knife to said surface, an elongated flexible gib disposed beneath and substantially coextensive with said knife, said knife and gib having substantially horizontal abutting surfaces, said bed having a surface on which said gib rests, the engaging surfaces of said gib and bed being inclined laterally with respect to said knife whereby lateral movement of said gib relative to said knife moves said gib vertically, and a plurality of means along said gib for adjusting intermediate portions of said gib laterally relative to said knife.

WILLIAM G. WEHR.

REFERENCES CITED

The following references are of record in the file of this patent:

UNITED STATES PATENTS

| Number | Name | Date |
|---|---|---|
| Re. 20,154 | Baker | Nov. 3, 1936 |
| 490,777 | Trethewey | Jan. 31, 1893 |
| 565,186 | Taylor | Aug. 4, 1896 |
| 691,234 | Bowen | Jan. 14, 1902 |
| 1,859,336 | Mac Chesney et al. | May 24, 1932 |
| 1,955,671 | Coyle | Apr. 17, 1934 |

FOREIGN PATENTS

| Number | Country | Date |
|---|---|---|
| 465,011 | Germany | Sept. 10, 1928 |
| 699,145 | France | Dec. 8, 1930 |